W. ERICKSON.
ROTARY INTERNAL COMBUSTION ENGINE.
APPLICATION FILED JAN. 9, 1919.

1,333,399.

Patented Mar. 9, 1920.
5 SHEETS—SHEET 1.

INVENTOR
W. ERICKSON
BY
F. M. Wright,
ATTORNEY

W. ERICKSON.
ROTARY INTERNAL COMBUSTION ENGINE.
APPLICATION FILED JAN. 9, 1919.

1,333,399.

Patented Mar. 9, 1920.
5 SHEETS—SHEET 3.

INVENTOR
W. ERICKSON
BY

ATTORNEY

W. ERICKSON.
ROTARY INTERNAL COMBUSTION ENGINE.
APPLICATION FILED JAN. 9, 1919.

1,333,399.

Patented Mar. 9, 1920.
5 SHEETS—SHEET 4.

INVENTOR
W. ERICKSON
BY
ATTORNEY

W. ERICKSON.
ROTARY INTERNAL COMBUSTION ENGINE.
APPLICATION FILED JAN. 9, 1919.

1,333,399.

Patented Mar. 9, 1920.
5 SHEETS—SHEET 5.

INVENTOR
W. ERICKSON

BY  *Jno. Wright*,

ATTORNEY

UNITED STATES PATENT OFFICE.

WILLIAM ERICKSON, OF SAN FRANCISCO, CALIFORNIA.

ROTARY INTERNAL-COMBUSTION ENGINE.

1,333,399. Specification of Letters Patent. Patented Mar. 9, 1920.

Application filed January 9, 1919. Serial No. 270,424.

*To all whom it may concern:*

Be it known that I, WILLIAM ERICKSON, a citizen of the United States, residing at San Francisco, in the county of San Francisco and State of California, have invented new and useful Improvements in Rotary Internal-Combustion Engines, of which the following is a specification.

The object of the present invention is to provide a rotary internal combustion engine in which the force obtained from the combustion of fluid fuel will be applied in the most direct and economical manner to produce power, and in which vibration will be as much as possible eliminated.

Figure 1:
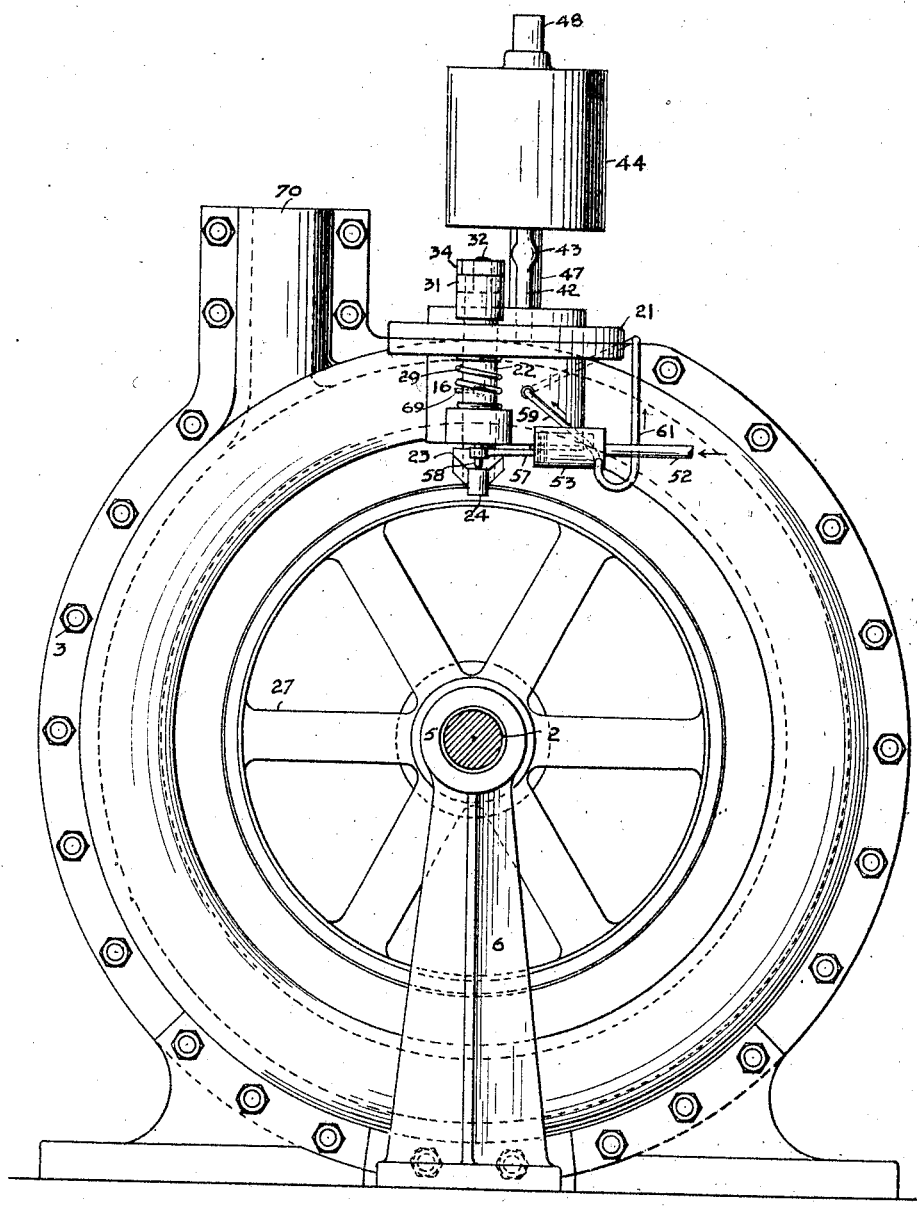
Figure 2:
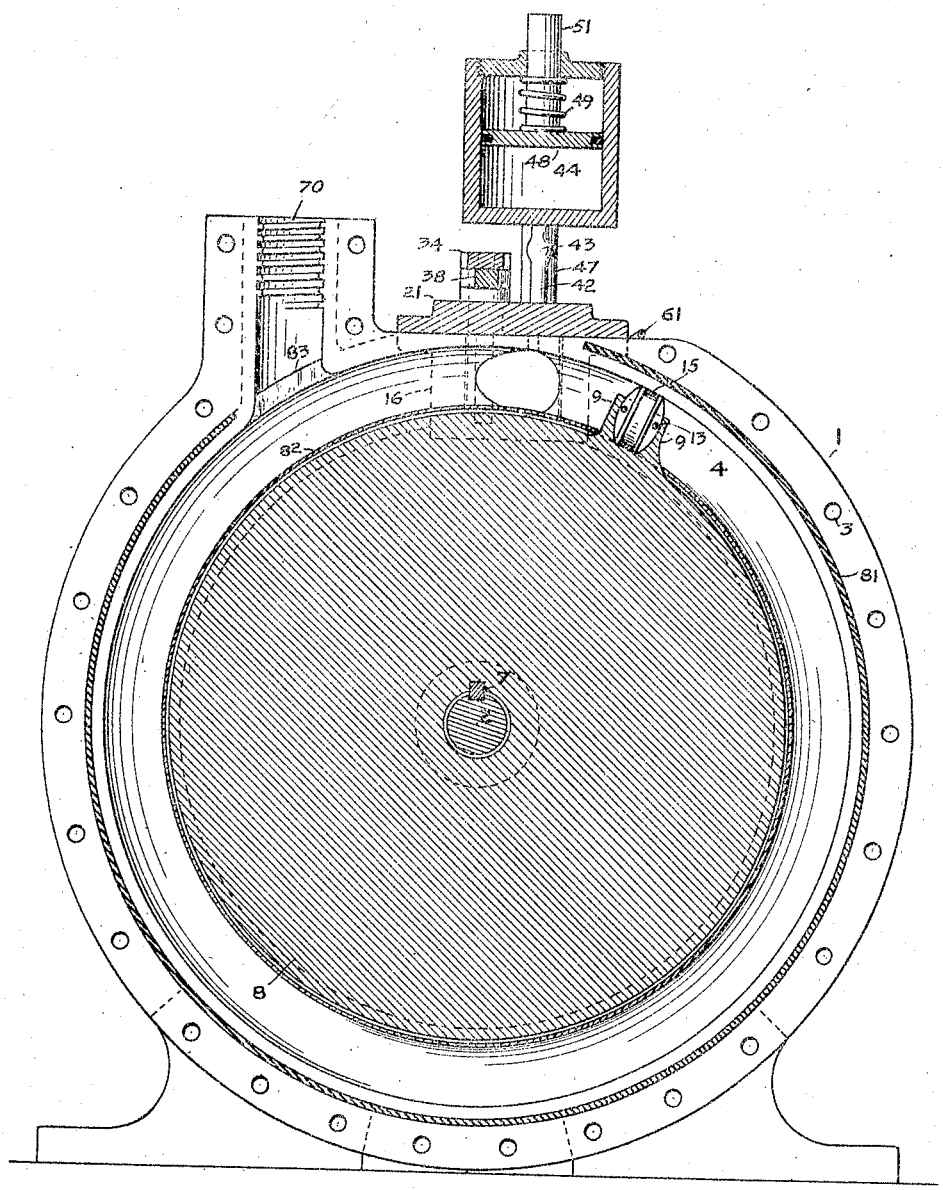
Figure 3:
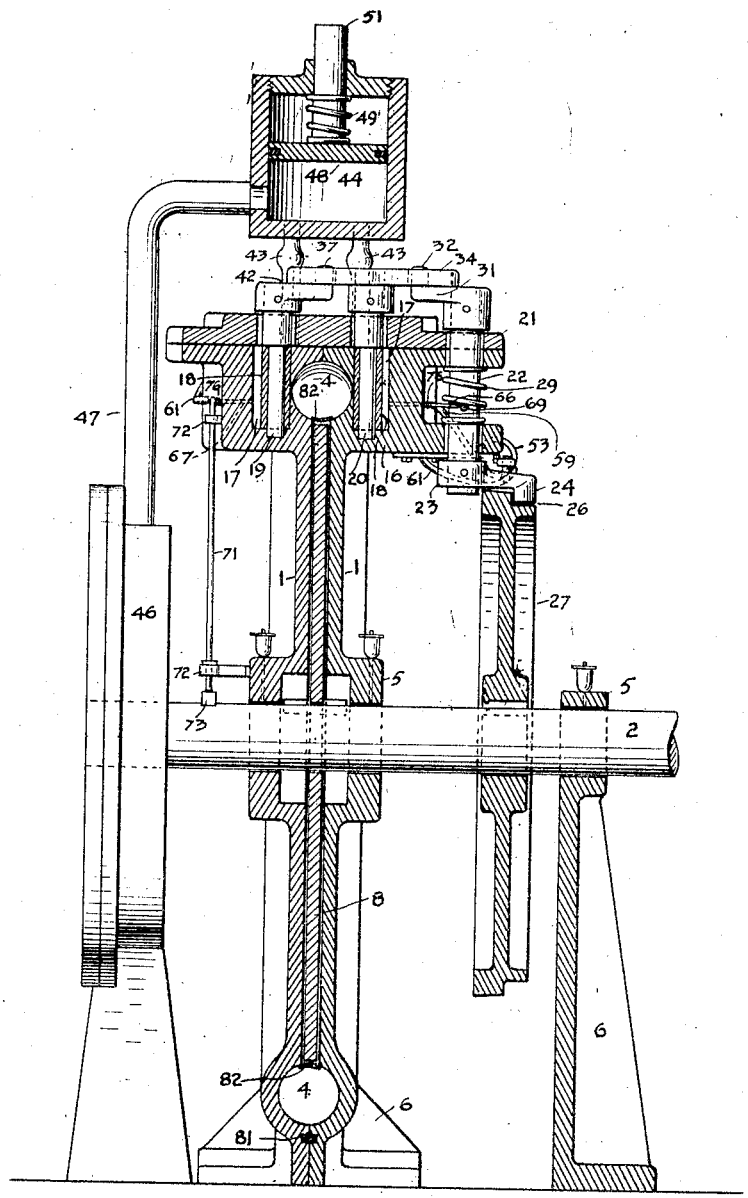
Figure 4:
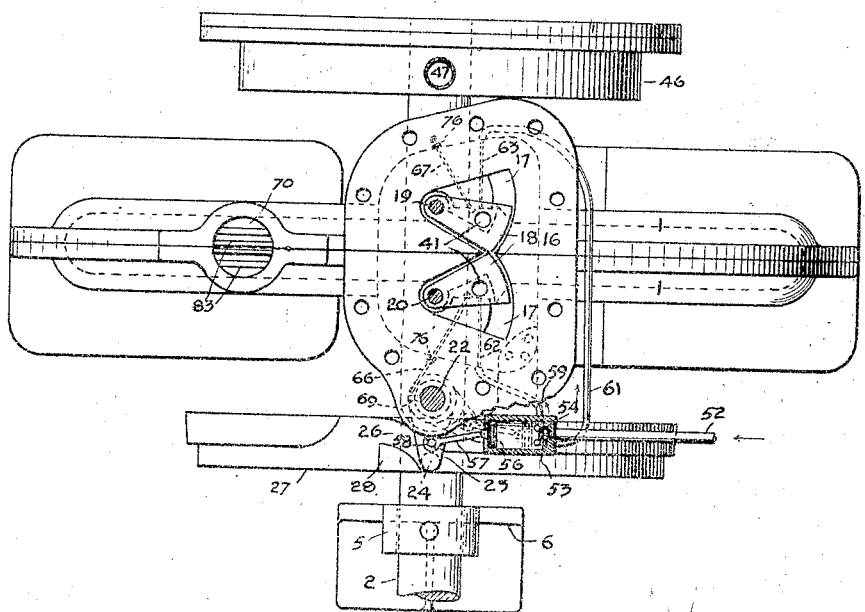
Figure 5:
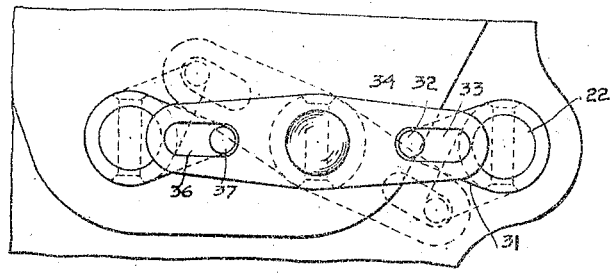
Figure 6:
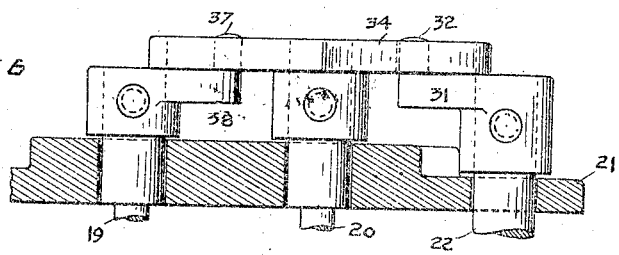
Figure 7:
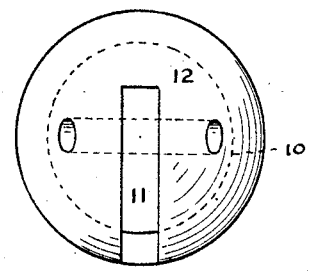
Figure 8:
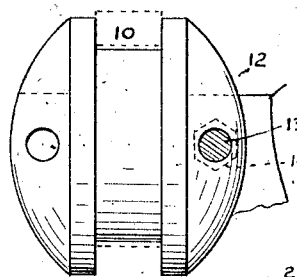
Figure 10:
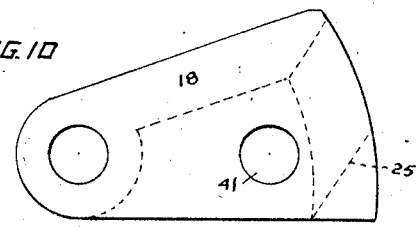
Figure 9:
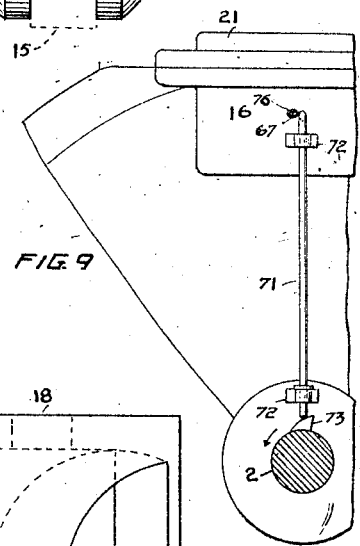
Figure 11:
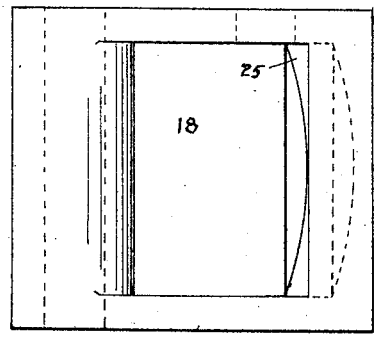
Figure 12:
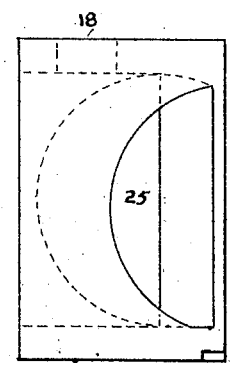
Figure 13:
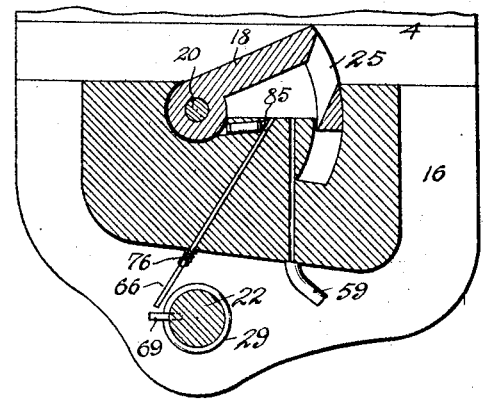

In the accompanying drawing, Figure 1 is a side view of my improved engine, the main shaft being shown in cross-section; Fig. 2 is a central section thereof, transverse to the main shaft, certain parts being shown in side elevation; Fig. 3 is a vertical section thereof taken along the central shaft, certain parts being shown in side elevation; Fig. 4 is a horizontal section on the line 4—4 of Fig. 1; Fig. 5 is an enlarged plan view of a portion of a valve or gate operating mechanism; Fig. 6 is a side view of the same, certain parts being shown in vertical section; Fig. 7 is an end view of a piston; Fig. 8 is a side view of the same; Fig. 9 is a detail side view of a portion of the engine, showing part of the ignition mechanism; Fig. 10 is a plan view, Fig. 11 is a side view and Fig. 12 is a front view, of a main valve or gate detached; Fig. 13 is a partial horizontal section through a spark plug 85 of the engine.

On referring to the drawing it will be seen that the casing of my improved engine is in two halves 1 separated on a plane transverse to the shaft 2 of the engine, and bolted together at the periphery, as shown at 3, a packing ring 81 being introduced into grooves between the two halves of the casing. Said two halves of the casing are formed each with a circular groove, each groove being in cross section of a semi-circular form, so that when said halves are fitted together there is formed a chamber 4 in the shape of an anchor ring, which chamber constitutes the working cylinder of my improved engine. The shaft 2 rotates in bearings 5 in the upper portions of standards 6. Keyed to said shaft 2, as shown at 7, is a disk 8 extending transversely to the shaft between the two halves 1 of the casing.

From two portions of the periphery of said disk 8 adjacent to each other extend outwardly lugs 9, which are received in grooves 11 in opposite sides of an approximately ball-shaped piston 12, formed with a groove 10 extending circumferentially in a plane at right angles to the plane of the disk 8, and in said groove is a slot ring 15 expanding and fitting tightly against the surface of the cylinder 4. In order to make the inner side of the working chamber air tight there is provided a spring 82 which surrounds the disk 8, and the ends of which are attached by any suitable means to the lugs 9.

The piston is secured to said lugs by bolts 13 passed therethrough and through said lugs 9, and by nuts 14 on the ends of said bolts.

On the upper portion of said cylinder is a valve chest 16, having valve chambers 17, in which valves 18 rock on vertical shafts 19. A cover 21 is bolted or otherwise secured to the valve chest 16 and has therethrough vertical openings registering with the vertical shafts 19, 20. Also extending vertically through said valve chest 16 and cover 21 is a shaft 22, to the lower end of which is secured an arm 23, from the free end of which depends a pin 24. Said pin 24 travels in a cam groove 26 on the periphery of a fly wheel 27 secured to the shaft 2. At a particular point in the rotation of said fly wheel, a cam 28 on its periphery engages the depending pin 24 and vibrates said arm 23 and thereby rocks the shaft 22 against the action of a spring 29 coiled around said shaft. To the upper portion of said shaft, projecting above the cover 21, is secured an arm 31, from the free end of which extends upwardly a pin 32, which can travel in a slot 33 extending longitudinally in an end of a lever 34 secured on the upper end of the valve shaft 20. Thereby it results that when said rock shaft 22 is rocked against the action of said spring 29 by the engagement of said cam 28 with the pin 24, said valve shaft 19 is also rocked. In the other end of said lever 34 is also a longitudinally extending slot 36 in which is a pin 37 extending upwardly from the free end of an arm 38 on the other valve shaft 19. Thereby both of said valve shafts, 19, 20, are rocked simultaneously in opposite directions.

The valves 18 secured to said shaft are precisely similar in said form; they each have flat upper and lower surfaces, the upper surfaces being on the same plane as the upper surface of the valve chest and having therethrough a vertically extending hole 41, which, in the closed position of the valve, registers with the lower end of an air pipe 42 having therein a check valve 43. Said pipes lead downwardly from the bottom of a cylindrical compressed air chamber 44 supplied with compressed air by any suitable means.

While the above is the preferred arrangement for an engine driven by steam or compressed air, the engine when driven by the combustion of gas, operates as follows: As the doors 18 open for the piston to pass, the air holes 41 in the doors will then come opposite to the air pipes 42 and let the air pass in. Then, when the combustion chambers are closed, the compressed mixture will be held better, and at the instant that the piston passes the door, the doors will close, and the gas is ignited, and the exploded gases will then pass through the holes 18 into the cylinder and propel the pistons. In this manner, the doors are closed behind the piston and will shut off the air, so that there will be no products of combustion going into the air pipe, and the air will be shut off again until the piston comes to the exhaust pipe, whereupon it will open to give time for the air or mixture to fill the combustion chamber.

I prefer the means herein shown, which consists of a centrifugal air compressor 46 mounted on the shaft 2 from which a compressed air pipe 47 leads into the compressed air chamber 44. The air is maintained under compression in said chamber by a plunger 48 sliding in said chamber and pressed inwardly by a spring 49 coiled around a guide rod 51 attached to said plunger and extending through the upper end of said chamber.

The interior of each valve forms a combustion chamber communicating with the angular working chamber 4 by a port 25 in the front end of said valve.

Since by the action of the cam 28 the arm 23 is turned through a considerable angle from a position extending in a plane transverse to the plane of the combined fly wheel and cam; and since, in the first named position, it engages the highest point of the wheel and is moved to a position in which it engages a relatively lower portion of the wheel, it is preferred to make the periphery of the wheel conical, or tapering slightly outward, instead of cylindrical, in order that, when said arm has been moved through such angle, the slope of the periphery of the wheel may raise the part of the arm engaged thereby as much as said arm would tend to drop, due to engaging a point at one side of the uppermost part of the wheel.

The fuel is supplied by a pipe 52 which is connected with a cylinder 53 and enters said cylinder through a non-return valve 54. In said cylinder is a piston 56 connected to one end of a leg 57 the other end of which is connected to a pin 58 on the arm 23. When said arm is rocked in the manner heretofore described the piston is moved in said cylinder and forces the oil through two pipes 59, 61 leading to opposite sides of the working cylinder and connected with ports 62, 63 which discharge into the combustion chambers, in the path of the air which is being forced thereinto through the pipes 42, thus furnishing a combustible mixture in said chambers.

The mixture of fuel and compressed air in said chambers is ignited by means of pins 66, 67 sliding in guide-ways into valve heads. The rear end of the pin on one of said working chambers is actuated at the proper time by a pin 69 extending from the shaft 22, when said shaft is returned by the tension of the spring 29, coiled around the shaft 22, the pin 69 impinges upon the outer end of the pin 66 and moves it inwardly, touching the spark plugs 85 and the separation of said pin from said spark plug causes a spark to be produced which ignites the combustible gases in the corresponding combustion chamber 17. The pin 67 on the other side of the working chamber is pressed inwardly by the beveled upper end of a slide rod 71 sliding in guides 72 and which is engaged by a cam 73 on the shaft 2. Both of these pins 66, 67, are pressed outwardly by coiled springs 76 around the outer end projecting outside of the valve head. The products of combustion resulting from the ignition of the combustion gases in the combustion chambers escape by oblique hole 25 in the front side of the rocking valve 18 in the working chamber 17 and propelling the piston therein, finally escaping by the outlet 70 after said piston passes said outlet. In order to prevent outward movement of the piston when passing the entrance to the outlet conduit, there are provided circumferentially extending bars 83, here shown as four in number, across said entrance. When the pressure in the combustion chamber becomes less than the compressed air pressure, compressed air passes the valves 43 and flows into the chamber 4 and maintains uniform the pressure in said chamber for the remainder of the rotation of the piston therein.

I claim:

1. The combination of a casing having a working chamber in the form of a ring and formed of two halves separated along a central plane, and having an exhaust outlet, a shaft extending transversely to said working chamber, a disk secured to said shaft and rotating between said halves of the casing, and having lugs extending outwardly from its periphery, a ball-shaped piston in said chamber having on opposite sides grooves in which said lugs are received, a valve movable transversely across said working chamber, means operated by the rotation of said shaft for automatically opening said valve to permit the piston to pass therethrough, means for automatically closing said valve when released from said opening means, means automatically operated by the rotation of said shaft for introducing fluid fuel into said combustion chamber, and means operated automatically by the rotation of said shaft for igniting said fuel.

2. The combination of a main shaft, a casing formed in two halves separated on a plane transverse to said shaft and secured together at their peripheries, said halves each formed with a circular groove, each groove being in cross section of a semi-circular form to provide a working chamber in the form of an anchor ring, a disk keyed to said shaft and extending transversely thereto between the two halves of the casing and having lugs extending outwardly from its periphery, a ball-shaped piston in said working chamber having on opposite sides grooves to receive said lugs and having a groove extending circumferentially in a plane at right angles to that of the disk, a slotted ring in said groove, a valve chest on said cylinder having valve chambers, valves rocking in said chambers, said valves being hollow to provide combustion chambers and provided with ports leading forwardly from said combustion chamber into the working chamber, a shaft parallel to said valve shafts, an arm secured to said latter shaft, a pin extending from said arm, a cam on said first-named shaft engaging said pin to vibrate said arm, means operatively connecting said last-named shafts whereby the rocking of said arm operates said valves when the cam has passed the pin, a fluid fuel pump, pipes leading therefrom to said valve chambers, means whereby rotation of said main shaft actuates said pump to supply fluid fuel to said combustion chambers, means for supplying compressed air to said combustion chambers, and means actuated by the rotation of said shaft for igniting the combustible gas in said combustion chambers.

3. The combination of a main shaft, a casing formed in two halves separated on a plane transverse to said shaft and secured together at their peripheries, said halves each formed with a circular groove, each groove being in cross section of a semi-circular form to provide a working chamber in the form of a ring, a disk keyed to said shaft and extending transversely thereto between the two halves of the casing and having lugs extending outwardly from its periphery, a ball-shaped piston in said working chamber having on opposite sides grooves to receive said lugs and having a groove extending circumferentially in a plane at right angles to that of the disk, packing in said groove, a valve chest on said cylinder having valve chambers, valves rocking in said chambers, said valves being hollow to provide combustion chambers and provided with ports leading forwardly from said combustion chambers into the working chamber, a shaft parallel with said valve shafts, means secured to said latter shaft, operated by the rotation of the main shaft, to open said valves, a fluid fuel pump, pipes leading therefrom to said combustion chambers, means whereby rotation of said main shaft actuates said pump to supply fluid fuel to said combustion chambers, means for supplying compressed air to said combustion chambers, and means actuated by the rotation of said shaft for igniting the combustible gas in said combustion chambers.

WILLIAM ERICKSON.